United States Patent [19]
Lu

[11] Patent Number: 5,345,519
[45] Date of Patent: Sep. 6, 1994

[54] TEMPERATURE-COMPENSATED FIBER OPTIC EXTERNAL CAVITY STRAIN SENSORS AND AN INTENSITY-BASED FIBER OPTIC SENSOR SYSTEM

[75] Inventor: Zhuo J. Lu, Pierrefonds, Canada

[73] Assignee: Canadian Marconi Company, Montreal, Canada

[21] Appl. No.: 120,353

[22] Filed: Sep. 14, 1993

[51] Int. Cl.$^5$ .............................. G02B 6/02; H01J 5/16
[52] U.S. Cl. ........................................ 385/12; 385/13;
385/31; 385/38; 250/227.11; 250/227.14;
250/227.18
[58] Field of Search ................. 385/12, 13, 14, 18,
385/27, 38, 31, 47, 49, 51; 250/227.11, 227.14,
227.18, 227.19, 227.27, 227.28, 231.19, 230, 238,
239; 356/352

[56] References Cited

U.S. PATENT DOCUMENTS

| | | | |
|---|---|---|---|
| 4,137,462 | 1/1979 | Wyler | 250/227.11 X |
| 4,307,937 | 12/1981 | Gordon | 385/12 X |
| 4,749,856 | 6/1988 | Walker et al. | 250/227.11 X |
| 4,891,512 | 1/1990 | Naden | 250/231.19 X |
| 4,932,263 | 6/1990 | Wlodarczyk | 250/231.19 X |
| 4,995,697 | 2/1991 | Adamovsky | 250/227.11 X |
| 5,177,805 | 1/1993 | Groger et al. | 385/12 |
| 5,202,939 | 4/1993 | Belleville et al. | 385/12 |
| 5,280,548 | 1/1994 | Atwater et al. | 385/12 |
| 5,290,103 | 3/1994 | Fevrier et al. | 385/12 X |

Primary Examiner—Brian Healy
Attorney, Agent, or Firm—Fisher & Associates

[57] ABSTRACT

Three types of temperature compensated fiber optic external cavity strain sensors and methods of operation thereof are disclosed as well as an intensity-based fiber optic external cavity sensor and system. The fiber optic external cavity sensors each comprise an input optical fiber and a wire bonded together in spaced axial alignment by a connecting sleeve wherein respective ends of the fiber and the wire face one another and are spaced apart a predetermined distance to define an air gap. The ends of the input fiber and wire form two reflective surfaces. The temperature compensation methods involve either keeping the air gap unchanged with respect to temperature variations or having a temperature sensitive reflector at the tip of the wire. An intensity-based external cavity sensor comprises an input fiber which is a single mode fiber. An optical bandpass filter is deposited at the end of the single mode fiber. A reflector is also provided at the end of the wire. In the intensity-based sensor system, a LED, two couplers and a pair of photodetecters are used. There is also a bandpass filter, which is similar to the one in the sensor, in front of one of the photo-detectors. The spectrum of the return light from the sensor is modified as the air gap changes. The spectral changes are detected by a simple spectral radiometric method, which ratio the signals of the two detectors.

16 Claims, 9 Drawing Sheets

TEMPERATURE-COMPENSATED FIBER OPTIC EXTERNAL CAVITY STRAIN SENSORS AND AN INTENSITY-BASED FIBER OPTIC SENSOR SYSTEM

BACKGROUND OF INVENTION

1. Field of the Invention

The present invention relates to fiber optic external cavity strain sensors, including Fabry-Perot interferometric and intensity-based sensors and an intensity-based fiber optic sensor system using single mode fiber and bandpass filter as fiber optic sensor means and a method of measuring strain.

2. Description of Prior Art

In the past decade, fiber optic external cavity sensors (FOECS) have been developed for strain and temperature measurements. A FOECS comprises an input fiber and a wire bonded together in spaced axial alignment by a connecting sleeve wherein respective ends of the fiber and wire face one another and are spaced apart a predetermined distance to define an air gap. (A wire is a general term which refers to a wire shaped object of any material, such as a multimode fiber, a glass fiber, or a metal wire, etc.) The ends of the input fiber and the wire form two reflective surfaces. Physical conditions such as strain or temperature cause changes in the air gap, which modifies the reflected signal from the sensor. For strain measurement, a FOECS is bonded on a host structure whose deformation is to be measured. One major problem of strain measurement is temperature compensation. When temperature changes, the strain sensor will measure an apparent strain caused by the thermal expansion of the host structure. It is very important that a strain sensor can compensate the apparent strain and distinguish it from the mechanical strain of interest.

FOECS can be divided into two types, interferometric and intensity-based sensors. Known in the art are the following documents: MURPHY et al., "Quadrature phase-shifted, extrinsic Fabry-Perot optical fiber sensors", Optics Letters, Vol. 16, No. 4, p273, (1991); WANG and MURPHY, "Optical-fiber temperature sensor based on differential spectral reflectivity", Smart Mater. Struct. 1, p5, (1992). These documents relate to, respectively, using extrinsic Fabry-Perot to measure strain and intensity-based FOECS to measure temperature. There was no temperature compensation in the strain sensor.

Also known in the art documents: U.S. Pat. No. 5,202,939, Apr. 13, 1993, Belleville et al, "White-light interferometric multimode fiber-optic strain sensor"; Optics Letters, Vol. 18, No. 1, p78, (1993). These documents relate to using interferometric FOECS for strain measurement. The temperature compensation method applied in the sensor is only limited to a wire: a) which is made of the same material of the host on which the sensor is to be bonded, b) whose length covers the entire gauge length of the sensor. This method requires changing the material of the wire every time a different host is used. Furthermore, not all of the material that the host is made of can be pulled into a wire and polished to form an optical reflective surface at the tip.

One of the temperature compensation methods provided by the invention involves using a temperature sensitive reflector. Temperature sensitive reflectors have been used for temperature measurement before, rather than as an active temperature compensation method for strain measurement. A. Wang and K. A. Murphy, Smart Mater. Struct. 1, p5, (1992) and G. Boreman, R. Walters and D. Lester, SPIE, Vol. 566, p312 (1985) describe temperature sensors using interference filters whose transmission responses are functions of temperature.

Many types of systems have been developed for fiber optic sensors. Because of the periodical nature of the interference fringes, interferometric sensors require relatively complicated signal processing techniques in order to achieve absolute strain measurement, see, for example, C. Belleville and G. Duplain, Optical Letters, No. 18, p78, (1993). On the other hand, an intensity-based sensor measures the return light intensity changes from the sensor. An intensity-based sensor system must be able to distinguish the loss caused by the transmission line or connectors, etc. In the past, some intensity based sensors used a dual-wavelength measurement technique, which performs measurement in one wavelength and calibrates the system loss with the other wavelength, see, for example, E. Snitzer, W .W. Morey, and W. H. Glenn, Optical Fibre Sensors, Conf. IEE London, Pub. No. 221, p79 (1983); R. Jones and K. W. Jones, Opt. Eng., 27, p23 (1988); and A. Wang and K. A. Murphy, Smart Mater. Struct. 1, p5, (1992) . Such referencing method is vulnerable to differential transmission loss in wavelength caused by micro bend, especially for multimode fiber transmission lines, as discussed by Jones et al, system requires a reliable self-referencing technique.

A feature of the present invention is to provide practical temperature compensation methods for FOECS in strain measurement. These methods can be applied to all types of FOECS, interferometric or intensity-based. These methods allow temperature compensation for hosts of various materials, including concrete, composite materials, and metals, etc.

A further feature of the present invention is to provide a simple, reliable, and low-cost intensity-based FOECS and system for strain measurement. The FOECS and system may also be used for sensing other physical parameters that can cause the air gap changes in the sensor.

SUMMARY OF INVENTION

According to the present invention, there is provided a) three different temperature compensation methods for FOECS; and b) an intensity-based FOECS and system.

According to the present invention, the temperature compensation methods involve either keeping the air gap unchanged with respect to temperature variations or having a temperature sensitive reflector at the tip of the wire. These methods comprise:

1) A temperature compensated FOECS for strain measurement having a thermal compensation wire, which has a higher thermal expansion coefficient than that of the host. The length of the wire in the sensor is shorter and proportional to the gauge length.
2) A temperature compensated FOECS for strain measurement having a thermal compensation wire, which has an equal or lower thermal expansion coefficient than that of the host. The length of the wire in the sensor is longer and proportional to the gauge length.

3) A temperature compensated FOECS comprises a temperature sensitive reflector, at the end of the wire, whose reflectivity increases proportionally to the decrement in temperature.

According to the present invention, there is also provided a novel intensity-based FOECS and system. The system is insensitive to optical transmission line loss. The system can be used to measure physical parameters that cause changes of the air gap of the sensor. The sensor is an intensity-based FOECS, in which the input fiber is a single mode fiber and a bandpass filter is deposited on the end of the single mode fiber and combines with the temperature compensation methods for strain measurement. The sensor system includes a broadband light source, typically a light emitting diode (LED), and two couplers, which direct light to the sensor and couples return light to two photo-detectors. There is also a bandpass filter, which is similar to the one in the sensor, in front of one of the photo-detectors. The center wavelength of the LED and the bandpass filter are the same, but the bandwidth of the filter is less than that of the LED. The spectrum of the return light from the sensor is modified as the air gap changes. The spectral changes are detected by a simple spectral ratiometric method, which ratios the signals of the two detectors and therefore obtains the ratio as a function of the air gap.

Three temperature compensation methods for using FOECS in strain measurement are provided. These temperature compensated FOECS can be either interferometric or intensity-based, and are independent of the sensor system provided by the present invention. The present invention also provides a novel intensity-based FOECS and system. The sensor is a FOECS, in which the input fiber is a single mode fiber and a bandpass filter is deposited at the end of the fiber. The intensity-based FOECS can also be used with any one of the temperature compensation methods to form temperature compensated FOECS. The main advantage of this sensor system is that it is a single mode intensity based system. A single mode fiber based sensor provides a well defined response for all sensors. Thus, the system only requires to calibrate for a batch of sensors which are made of the same fiber, rather than every individual sensor. Using a single mode fiber transmission line can remove unwanted parasitic reflections from connectors or splices by simply angled connectors or splices. Since both the light source and the bandpass filter responses are nearly symmetric and centering the same wavelength, the sensor system is also robust with respect to differential transmission loss in wavelength.

BRIEF DESCRIPTION OF DRAWINGS

A preferred embodiment of the present invention will now be described with reference to the accompanying drawings in which:

FIGS. 2A, 2B and 2C are temperature compensated intensity-based FOECS;

DESCRIPTION OF PREFERRED EMBODIMENTS

Figure 1A:
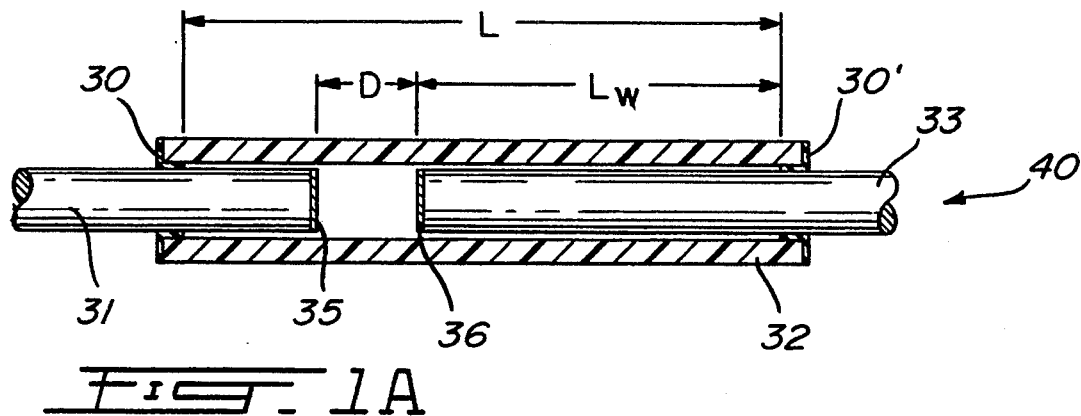
FIGS. 1A, 1B and 1C are simplified side views, partly fragmented, of temperature compensated FOECS.

FIG. 1A illustrates a temperature compensated FOECS 40 for strain measurement. The sensor comprises an input optical fiber 31 and a wire 33 joined together by a connecting sleeve 32 at bonding points 30 and 30' at the ends of the sleeve. A wire is a general term which refers to a wire shape member of any material, such as a multimode fiber, a glass fiber, or a metal wire, etc. The bonding points or areas are the small areas which join two different components together. The bonding points can be formed by adhesives, fusion, or welding, etc. The end of the optical fiber 31 has a semi-reflective surface 35, which can be obtained by either cleaving or polishing the end surface, or by thin film coatings on the cleaved or polished end surface. The end of the wire 33 has a reflector 36, which reflects light from the input fiber 31 back to the fiber 31. The reflector can also be obtained by either cleaving or polishing the end surface of the wire, or by thin film coatings on the cleaved or polished end surface of the wire. The ends of the input fiber 31 and the wire 33 define an air gap D. The bonding points 30 and 30' at the ends of the connecting sleeve 32 define therebetween the gauge length L of the strain sensor 40. The end of the wire 33 and the end bonding point 30' on which the wire is attached define a length of the compensation wire $L_w$. For strain measurement, the sensor will be bonded on a host structure (not shown in FIG. 1A) to measure the deformation of the host. The principle of the temperature compensation of the sensor is to keep the air gap D unchanged with respect to temperature variations. When the sensor is bonded on the host, the gap D will remain unchanged with respect to temperature variation, provided the following condition is satisfied:

$$C_{host}L = C_{wire}L_w + C_{fiber}(L - L_w - D) \qquad (1)$$

or $$C_{host}L = C_{wire}L_w \qquad (2)$$

where $C_{host}$, $C_{wire}$, and $C_{fiber}$ are the thermal expansion coefficients of the host, the wire, and the fiber, respectively. Since $C_{fiber}$ usually is much smaller than $C_{host}$ and $C_{wire}$, equation (1) can be simplified to equation (2). When the sensor is bonded to the host, the thermal expansion of the host will cause the connecting sleeve to expand. However, because the wire can also expand freely inside the sleeve, the air gap D remains unchanged despite changes in temperature. Note, because of $L>L_w$, therefore $C_{host}<C_{wire}$, this method requires that the wire has a higher thermal expansion coefficient than the one of the host.

Figure 1B:
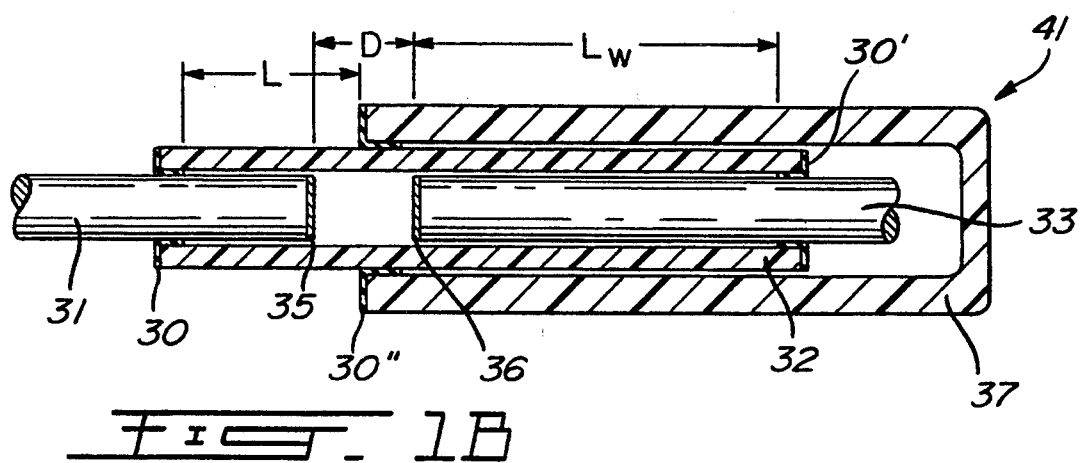

Figure 1B illustrates a temperature compensated FOECS 41 for strain measurement. The sensor comprises two parts, an inner device similar to the sensor 40 shown in FIG. 1A, and an outer capillary tube 37. One end of the capillary tube is sealed and the other end is bonded on the connecting sleeve 32 of the inner device. The bonding point 30 of fiber 31 and the connecting sleeve 32, and the bonding point 30" of the capillary tube 37 and the connecting sleeve 32, define the gauge length L of the sensor 41. Similar to sensor 40, in order to compensate the temperature effect or to keep the air gap D unchanged with respect to temperature changes, the condition given in equation (2) must also be satisfied in sensor 41. The same conditions that the thermal expansion coefficients of the fiber be much smaller than $C_{host}$ or $C_{wire}$ must hold so that their effect can be omitted. The difference between the temperature compensation methods of sensor 40 and 41 is that in sensor 41 $C_{host} \ll C_{wire}$, thus $L \bullet L_w$. The temperature compensation method of sensor 41 is particularly useful for developing an all-glass temperature compensated FOECS. For example, to develop a temperature compensated strain sensor for a host made of aluminum, that $C_{host}=2.5\times 10^{-5}/°C$. The input fiber, the connecting sleeve, and the outer capillary tube can all be made of fused silica, which has a very low thermal expansion coefficient of $5\times 10^{-7}/°C$. The compensation wire can be made of special glass which has a $C_{wire}=1.4\times 10^{-5}/°C$. Therefore, according to equation (2), the ratio of $L_w/L$ should be 1.79. The advantage of an all-glass sensor is that both the end surfaces 35 and 36 can be cleaved, and no polishing is required in producing the sensor. This can be very important for large scale sensor productions.

Figure 1C:
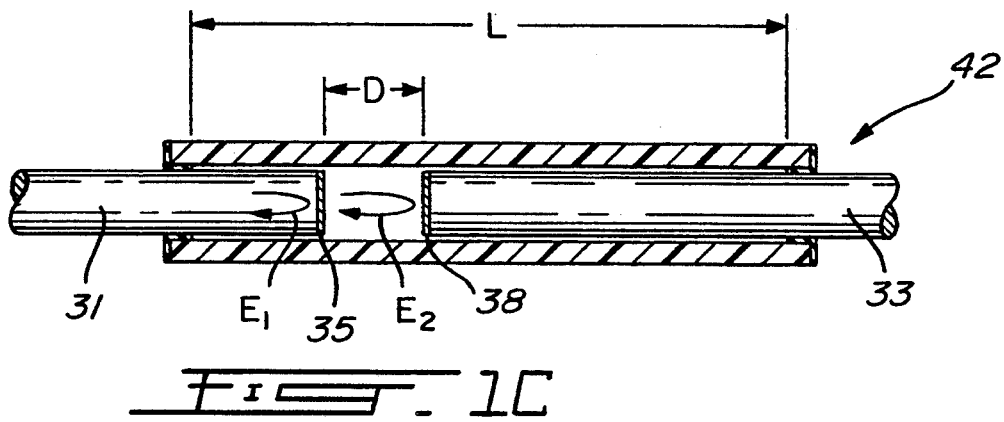

FIG. 1C illustrates a temperature compensated FOECS 42 for strain measurement. The sensor is similar to the sensor in FIG. 1A, except that the wire is made of material with a similar low thermal expansion coefficient as the input fiber 31, for example, a multimode fiber, and at the end of the wire is a temperature sensitive reflector 38. The return light from the sensor can be divided into two parts: light reflected by reflector 35, $E_1$, and light reflected by reflector 38, $E_2$. Since $E_2$ is the light that exits fiber 31, is reflected by reflector 38, then is collected again by fiber 31, it is a function of the air gap D as well as the reflectivity of reflector 38.

$$E_2 = E_0 T(D) R(t) \quad (3)$$

where $E_0$ is constant related to the input power to the sensor, T(D) is a function describing the return power collected by the fiber when a reflector is at given distance D, R(t) is the reflectance of the reflector 38 and a function of temperature t. The principle of temperature compensation of sensor 42 is to keep the return power $E_2$ unchanged as the temperature t changes. When the sensor is bonded on a host, temperature changes will cause the air gap D to vary due to thermal expansion of the host. Therefore, the air gap D(s,t) becomes a function of both strain s and temperature t. In order to keep $E_2$ unchanged with respect to t, the following condition must be satisfied:

$$\frac{1}{T} \frac{\partial T}{\partial D} \frac{\partial D}{\partial t} = -\frac{1}{R} \frac{dR}{dt} \quad (4)$$

For a given sensor gauge length, an input fiber, and the thermal expansion coefficient of the host, functions T(D) and D(s,t) are defined. A special temperature sensitive reflector with a response R(t) can be designed to satisfy the condition given by equation (4).

Figure 2A:
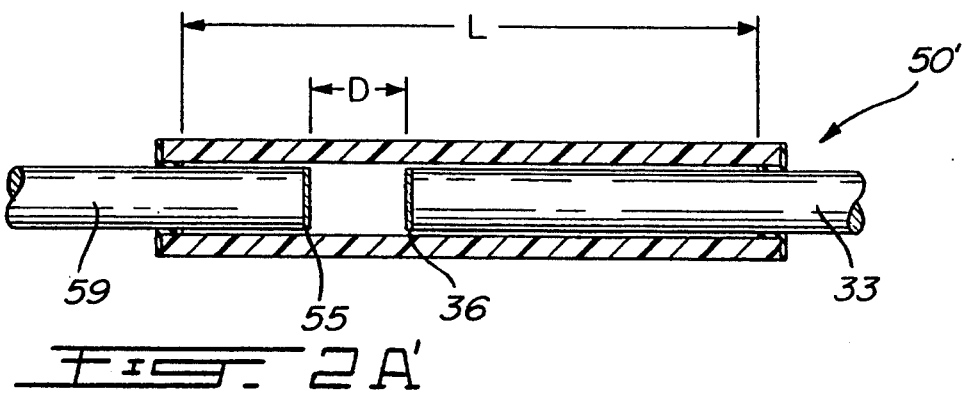
FIG. 2A' is a simplified side view, partly fragmented, of an intensity-based FOECS.
Figure 2A:
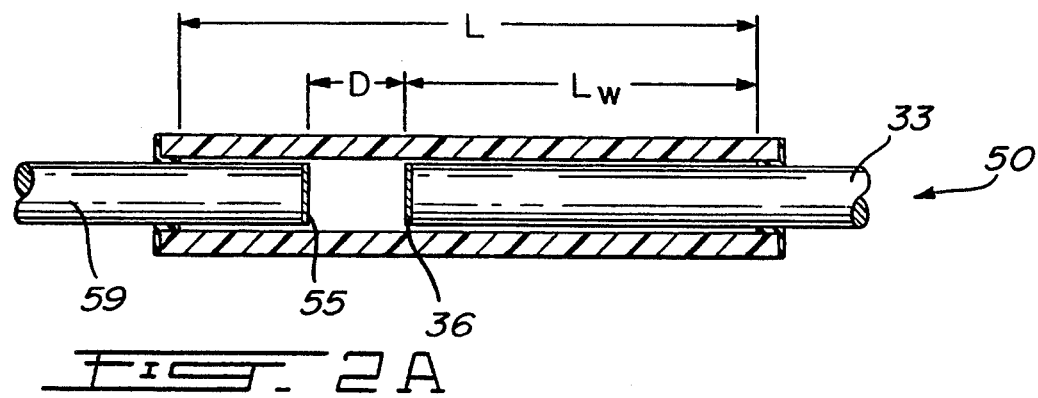

FIGS. 2A', 2A, 2B and 2C illustrate four configurations of the intensity-based FOECS. The input light to the sensor is from a broadband source. The sensor can be used to sense the air gap changes caused by physical parameters. The change of the air gap will modify the spectrum of the return light from the sensor.

FIG. 2A' illustrates an intensity-based FOECS 50'. The sensor is similar to sensor 42 shown in FIG. 1C, except that:

1) the input fiber is a single mode fiber 59;
2) the semi-reflector at the end of the fiber is a bandpass filter 55; and
3) a reflector 36 is provided on the end of wire 33.

Figure 2B:
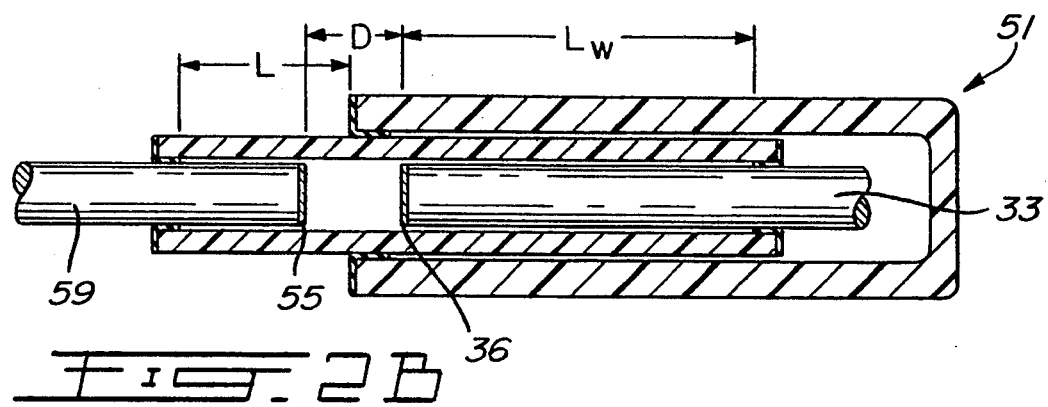
Figure 2C:
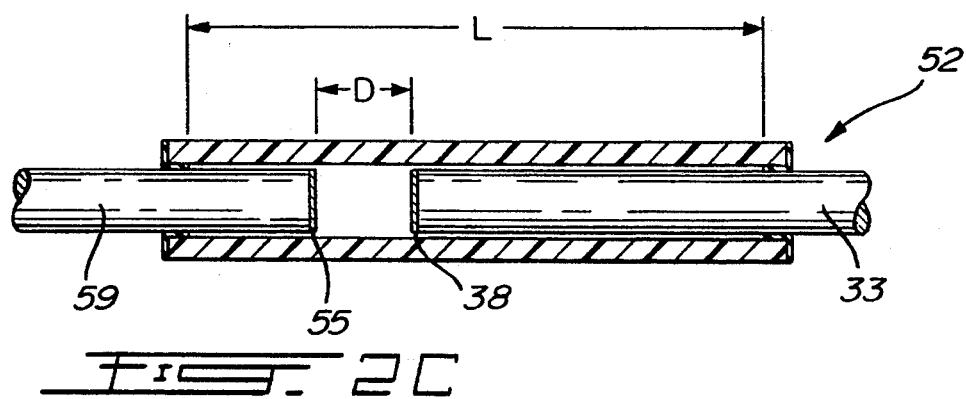

FIGS. 2A, 2B and 2C are temperature compensated intensity-based FOECS 50, 51 and 52, respectively, for strain measurement. The sensors 50, 51 and 52 are similar, respectively, to sensors 40, 41 and 42, except their input fibers are single mode fibers 59 and the semi-reflector at the end of the fibers are bandpass filters 55.

It should be pointed out that although sensor 40, 41, 42, 50, 51 and 52 are all referred to as strain sensors, it is also possible to use these sensors for temperature measurement. When these sensors are not bonded to the hosts, without the balancing effect of the hosts' thermal expansion, the air gap or $E_2$ vary with temperature and the sensors become temperature sensitive. Sensor 50' can be used as a temperature sensor when it is bonded to a temperature probe or a host with known thermal expansion coefficient, thus the change of the air gap becomes a function of temperature. The sensor can also be used for non-temperature compensated strain measurement by being bonded to a host.

Since the sensors 50', 50, 51 and 52 are intensity-based, interferometric effect in the sensors must be eliminated. The bandwidth of the bandpass filter 55, $dw_0$ and the minimum separation $D_{min}$ of the gap D, must satisfy the following relation:

$$e^{-(2\pi D_{min} \frac{dw0}{\omega 0^2})^2} \leq 10^{-3}$$

where $w_o$ is the center wavelength of the bandpass filter 55. This relation ensures the fringe visibility of interference of the reflections from the two reflecting surfaces remaining less than $10^{-3}$.

Figure 3A:
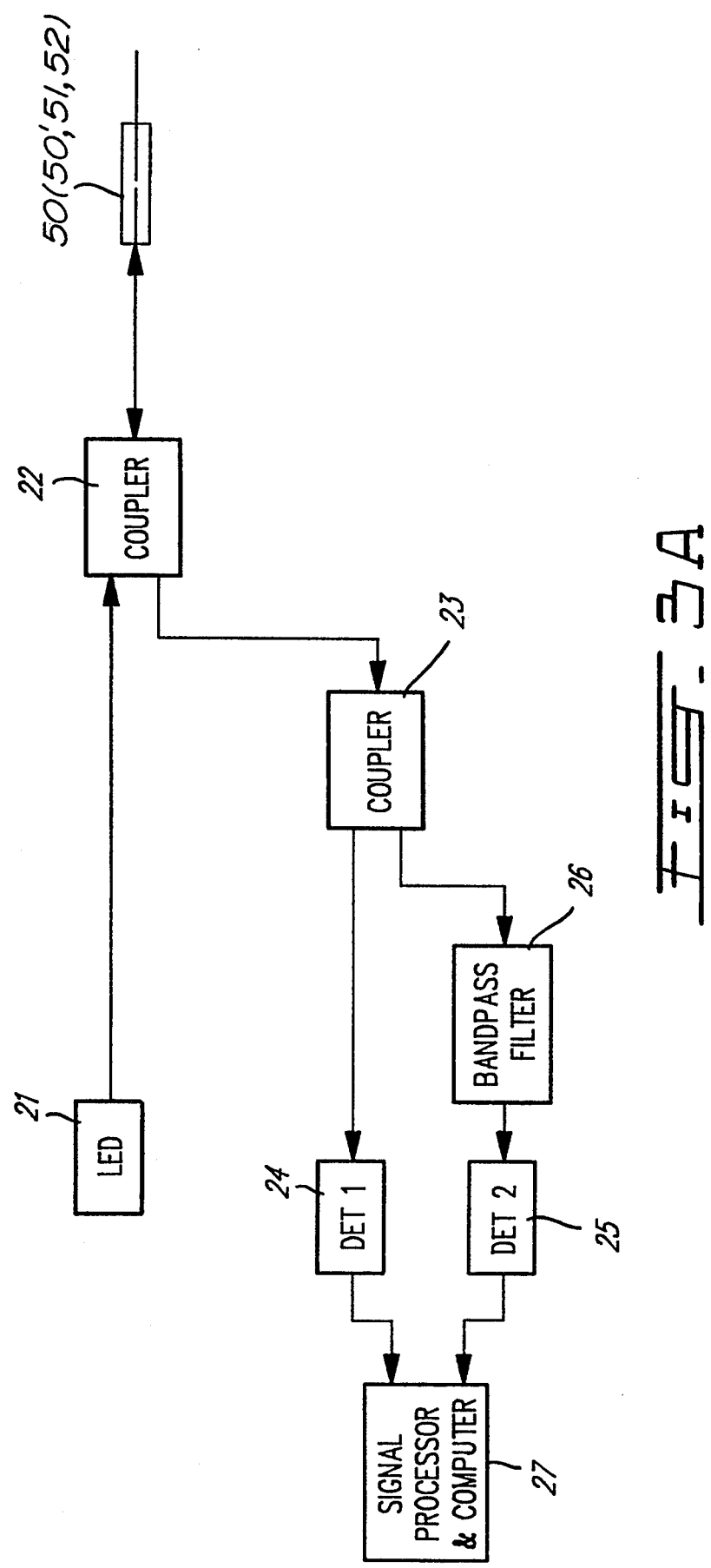
FIG. 3A is a simplified block diagram illustrating a conceptual configuration of a fiber optic sensor system using the sensor of the present invention.

FIG. 3a is a block diagram of a system using intensity-based FOECS. The system includes a broadband light source 21, two single mode optical couplers 22 and 23, two opto-detectors 24 and 25, and a sensor 50 (or 50' or 51 or 52). The light source 21 can be an LED with a typical bandwidth of 60 to 100 nm. The center wavelength of the LED and the bandpass filter at the sensor are the same, but the bandwidth of the filter 55 is narrower than that of the LED. The first coupler 22 directs light from the LED to the sensor 50 (or 50′, 51, 52) and the return light from the sensor to the second coupler 23 which splits the return light into two parts. The first part of the return signal goes directly to the first detector 24. The second part of the return signal goes through a bandpass filter 26 which can be either similar or identical to the one at the sensor 55. Information signals at the output of both detectors 24 and 25 are fed to a computer 27 for processing.

In order to distinguish between the intensity variations caused by changing of the air gap D and by the transmission line loss, the system uses a self-referencing scheme. The light from the LED 21 enters the sensor 50 (or 50′, 51, 52), it is then partially reflected by the bandpass filter 55 which has a narrower bandwidth than the LED spectrum. The transmitted light exits the end of the single mode fiber 59; reflects back by the reflector 36 (or 38); re-enters the single mode fiber 59 and passes the filter 55 again; and finally reaches the detectors 24 and 25. The return signal from the sensor includes two parts: 1) $I_r$, light reflected by the bandpass filter 55, 2) $I_t$, light passed the filter 55 then reflected by the reflector 36 (or 38). FIGS. 4, 5, 6 and 7 show respectively, the spectral characteristics of the LED 21, the bandpass filter 36 (or 38), $I_r$, and $I_t$, where w is the wavelength of the light, S(w) the spectrum of the LED, and F(w) the transmission spectral characteristics of the bandpass filter 55. $I_r$ and $I_t$ are different in terms of spectral content.

$$I_r(w) = (1 - F(w))S(w)$$

$$I_t(w) = F(w)F(w)S(w)$$

Figure 8:
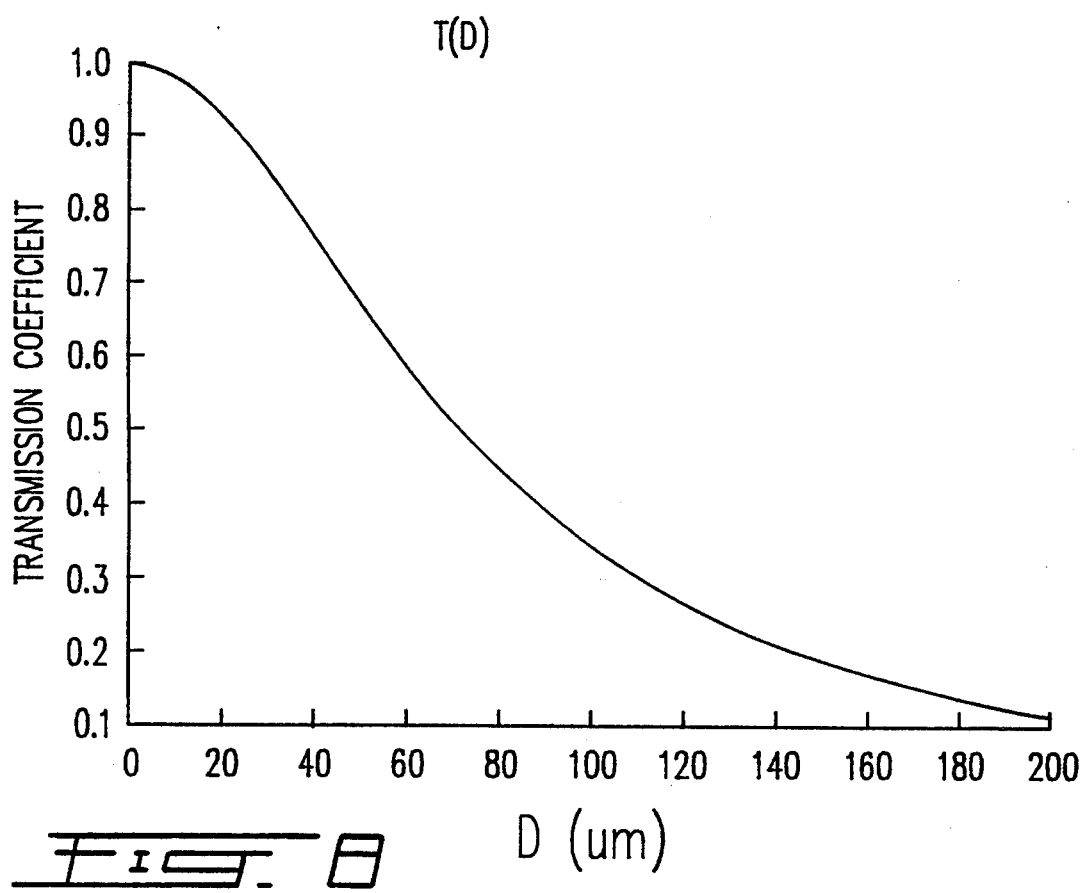
FIG. 8 is a characteristic curve of the effective transmission coefficient versus a function of cap separation of the sensor.

$I_t$ is the light that exits the single mode fiber, reflected by the reflector, then re-enters the single mode fiber. T is the effective transmission coefficient for $I_t$ and is a function of D, the separation between the end of the single mode fiber and reflector. FIG. 8 is a characteristic curve of T vs D for a 10 μm core single mode fiber. The characteristic curve is based on Gaussian approximation for the single mode fiber.

Figure 9:
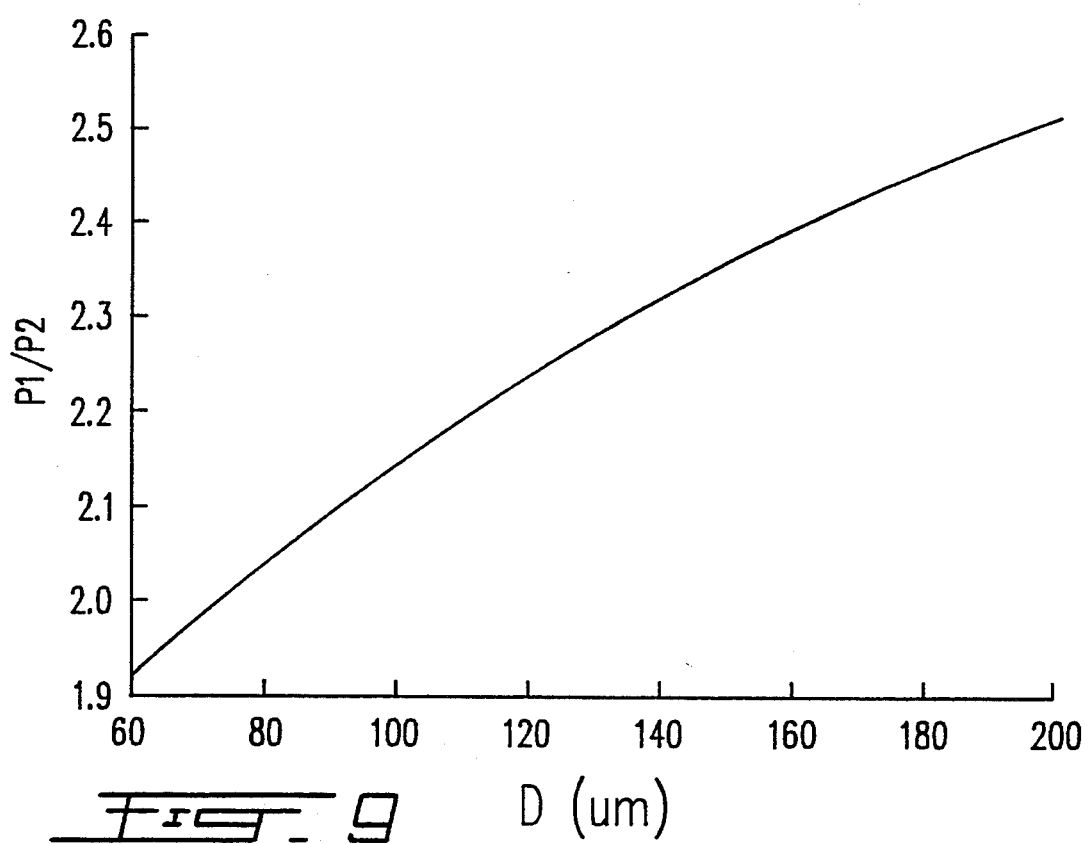
FIG. 9 is a characteristic curve of the ratio between the light received in both opto-detectors in relation to a function of gap separation of the sensor.

Light reaches detector 1 can be expressed by, $$P_1 = \int (aI_r(w) + bRTI_t(w))dw$$

and light reaches detector 2 can be expressed by, $$P_2 = \int F_d(w)(cI_r(w) + dRTI_t(w))dw$$

where R is the reflection coefficient of the reflector 36 (or 38), $F_d(w)$ transmission response of the bandpass filter 26 before the detector 25, and a, b, c and d are constants. $F_d(w)$ can be either equal to or similar to F(w). By taking a ratio of P1 and P2, the transmission line loss can be cancelled out, since it would affect both $P_1'/P_2'$, proportionally. FIG. 9 is a characteristic curve of $P_1'/P_2'$ vs D, where D in turn is a function of strain.

Figure 3B:
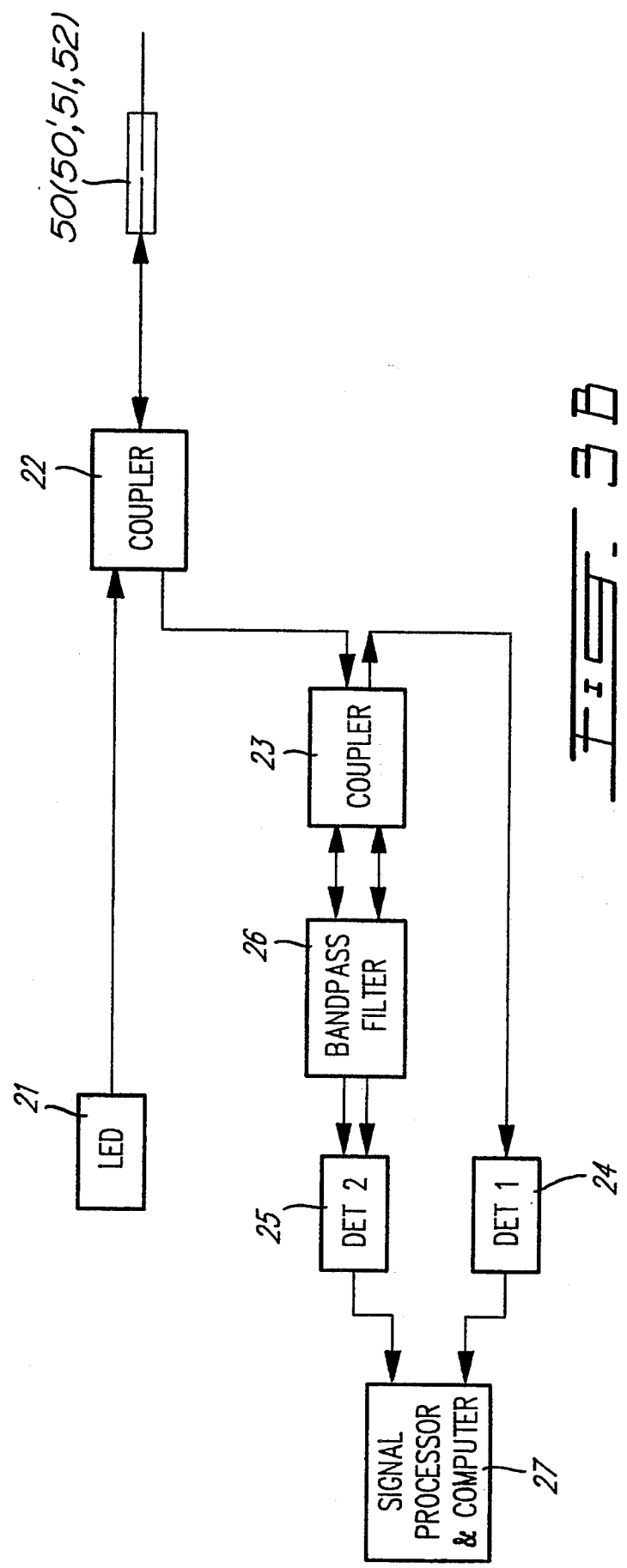
FIG. 3B is a simplified block diagram similar to FIG. 3A but of an alternative sensor system.
Figure 4:
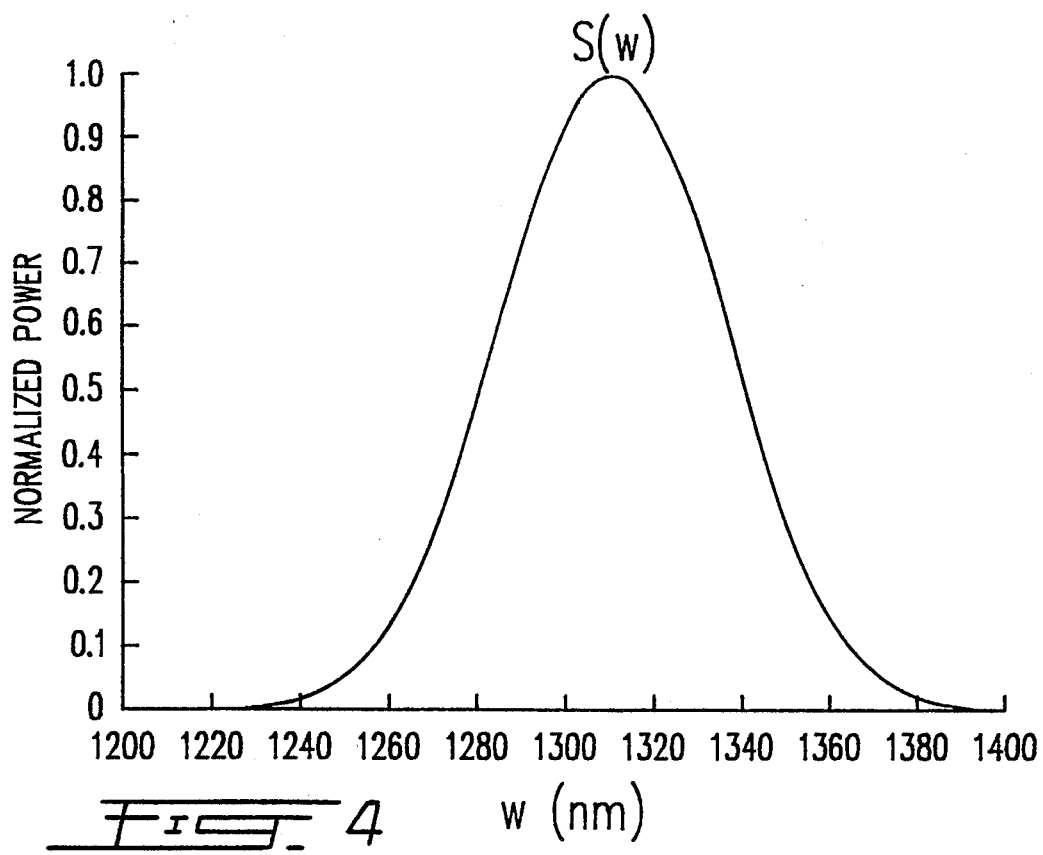
FIG. 4 is a spectral characteristic curve of the light source (LED) spectrum.
Figure 5:
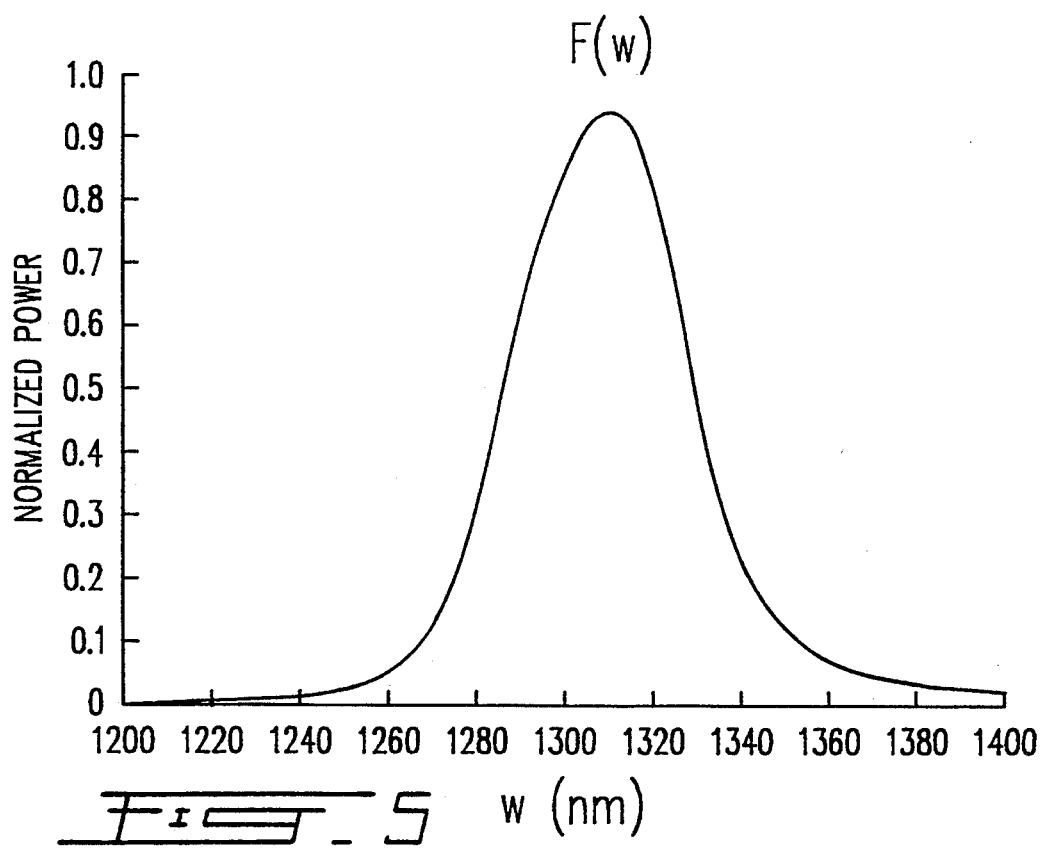
FIG. 5 is a spectral characteristic curve of the transmitted spectrum of the bandpass filter.
Figure 6:
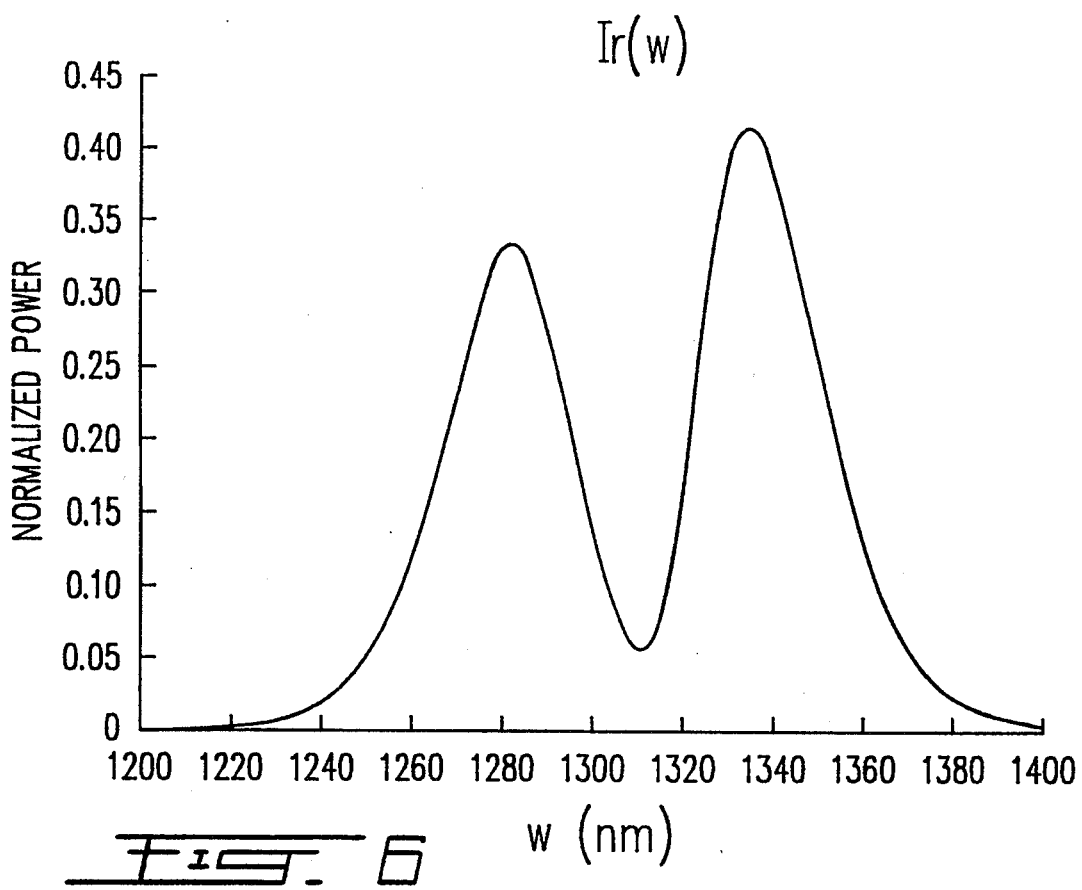
FIG. 6 is a spectral characteristic curve of the reflected power spectrum.
Figure 7:
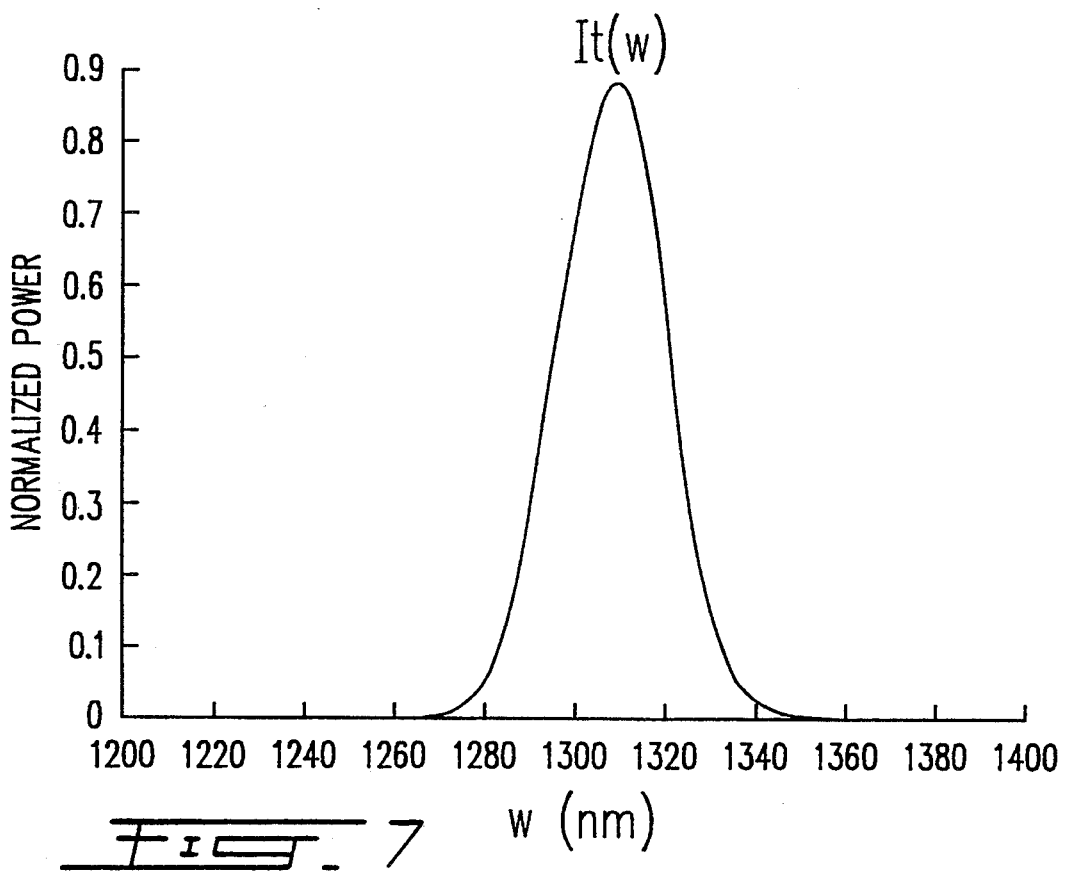
FIG. 7 is a spectral characteristic curve of the transmitted power spectrum.

FIG. 3B illustrates an alternative sensor system. In the system shown in FIG. 3B, the light that reaches detector 24 can be expressed by:

$$P_1' = \int (1 - F_d(w))(a'I_r(w) + b'RTI_t(w))dw$$

and the light that reaches detector 25 can be expressed by $$P_2' = \int F_d(w)(c'I_r(w) + d'RTI_t(w))dw$$

where a′, b′, c′ and d′ are constants. The difference between the system shown in FIGS. 3A and 3B is that $P_1$ uses the light directly from the coupler 22, while $p_1'$ uses the light reflected by the bandpass filter 26. Similarly $P_1'/P_2'$ is a function of D.

For strain measurement using sensors 50′, 50 or 51, the relation between strain and D, can be expressed as $$s = (D - D_o)/L$$

where s is the strain, $D_o$ the initial gap at zero strain, and L the gauge length of the sensor.

When using sensor 52 for strain measurement, although the air gap D is changing with temperature, the system parameter $P_1/P_2$ or $P_1'/P_2'$ remain unchanged with respect to the temperature changes. Since the sensor is designed to satisfy equation (4), when temperature increases, the reflectivity of the reflector 38, R increases to compensate the reduction in T caused by thermal expansion. Thus, for a given strain, $P_1/P_2$ or $P_1'/P_2'$ remains unchanged despite changes in temperature.

Figure 10:
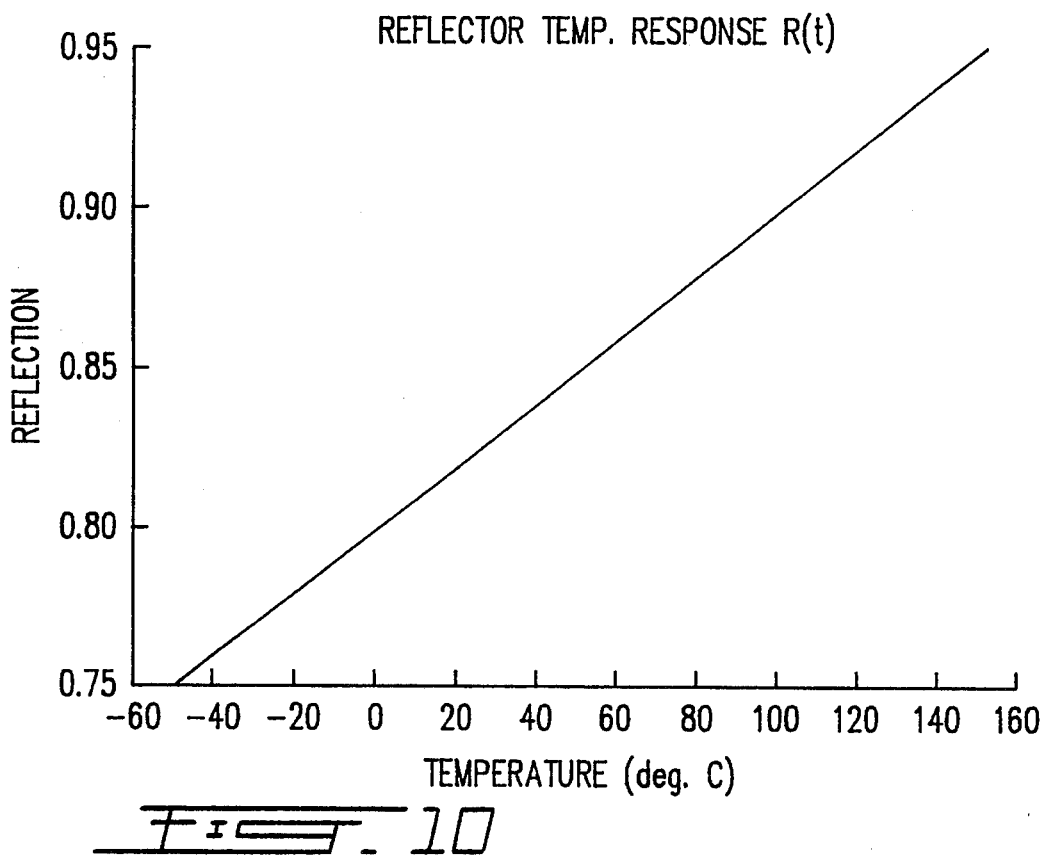
FIG. 10 is a characteristic curve which illustrates a typical temperature response of the reflector.

FIG. 10 illustrates a typical temperature response of the reflector. The slope of the temperature response curve can be designed for a given gauge length of the sensor to match the thermal expansion coefficient of the host.

Figure 11:
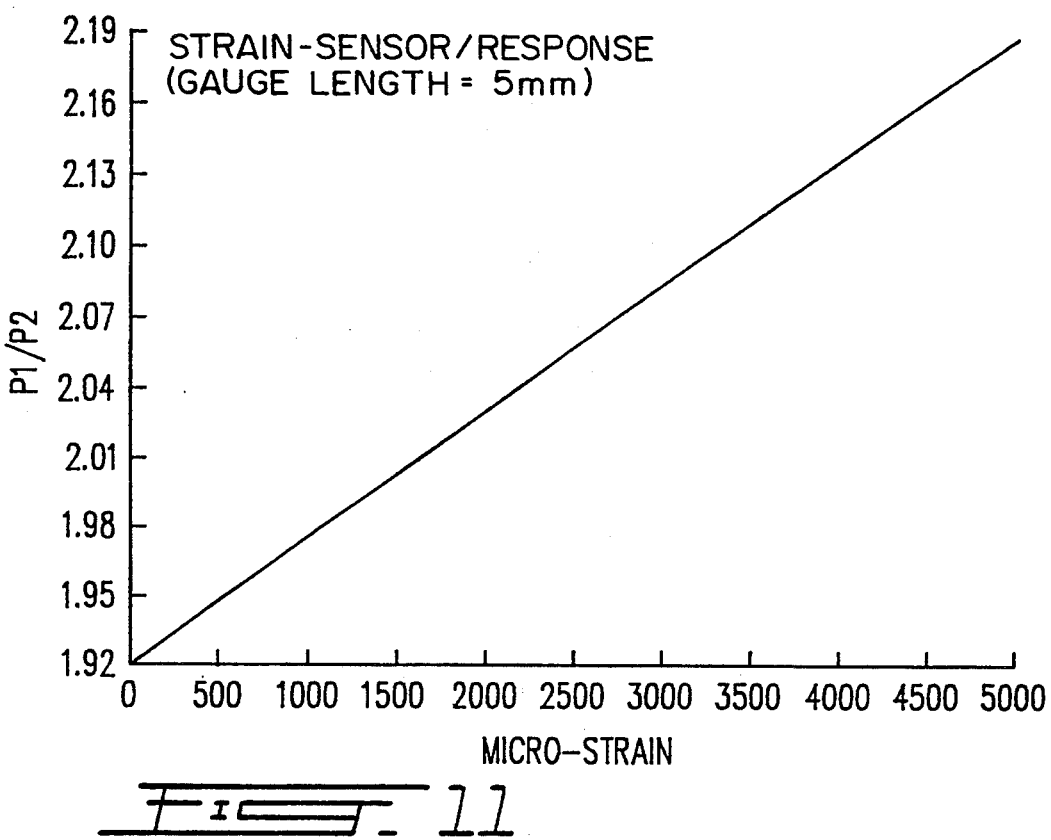
FIG. 11 is a characteristic curve of the ratio of the light received in both opto-detectors versus strain.

FIG. 11 illustrates the response of a sensor 52 matched to an aluminum host. By varying the slope and the gauge length, one can match a large variety of hosts with different thermal expansion coefficients over a typical required temperature range of −50° C. to 150° C.

The intensity-based sensors can also be used for temperature measurement. Sensors 50, 51 or 52 will not be bonded on hosts which would cancel the changing of the air gap D caused by temperature changes. In the case of sensor 50′, the sensor will be bonded on a host or a temperature probe to cause the air gap D to change with temperature variations. In either case, system parameters $P_1/P_2$ or $P_1'/P_2'$ become functions of temperature.

Figure 12:
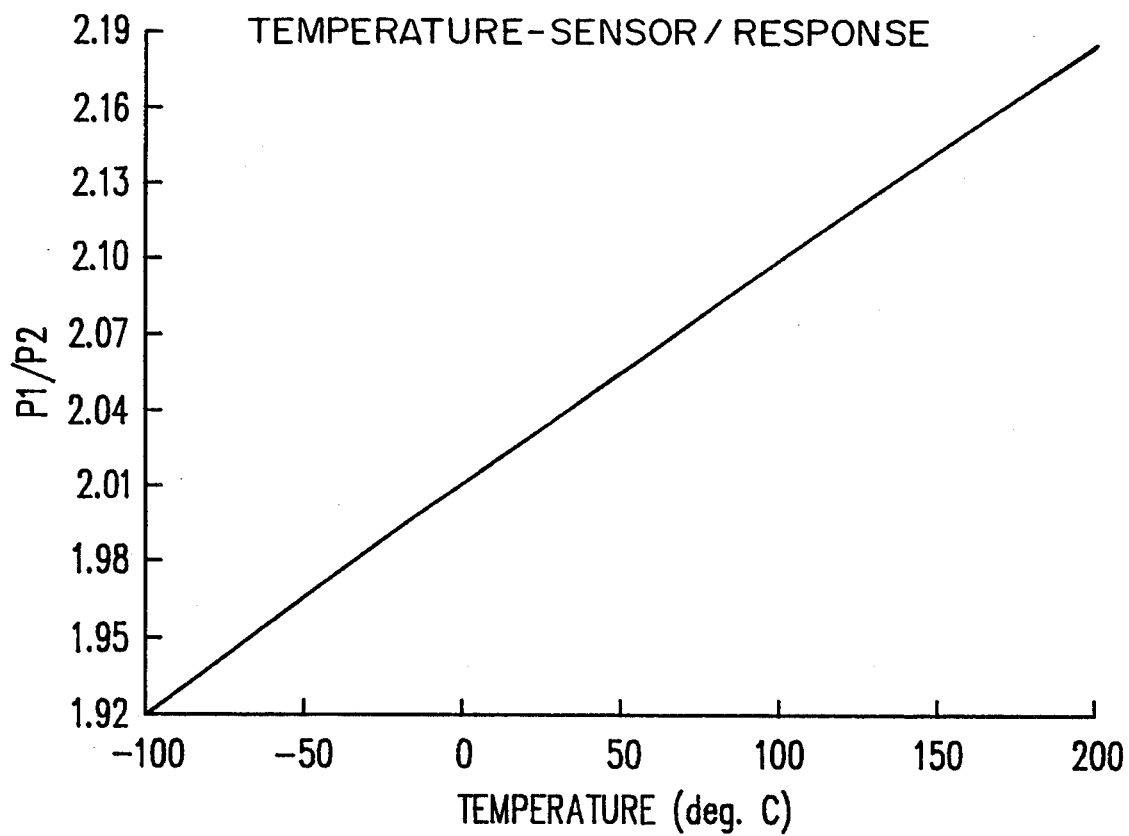
FIG. 12 is a characteristic curve of the ratio of the power received in the opto-detectors versus temperature.

FIG. 12 shows a typical temperature sensor response of the system. By choosing materials with different thermal expansion coefficients, one can vary the range and the temperature sensitivity of the sensors.

It is pointed out that the exact shapes of the functions, S(w), F(w), $F_d(w)$, R(t) and T(D), are not critical to the performance of the sensor system. Slight variations of these functions would only result in different calibration curves shown in FIGS. 9, 11 and 12. Changing the gauge length of the sensor 50 or 50′ or 51, or 52 or the splitting ratio of the second coupler 23 in the system may also vary the calibration curves.

In the system shown in FIG. 3A, detector 25 and the bandpass filter 26 in front of it, may be replaced by a semiconductor detector (not shown) which has the equivalent function that it is sensitive only to light of certain bandwidth.

Figure 13:
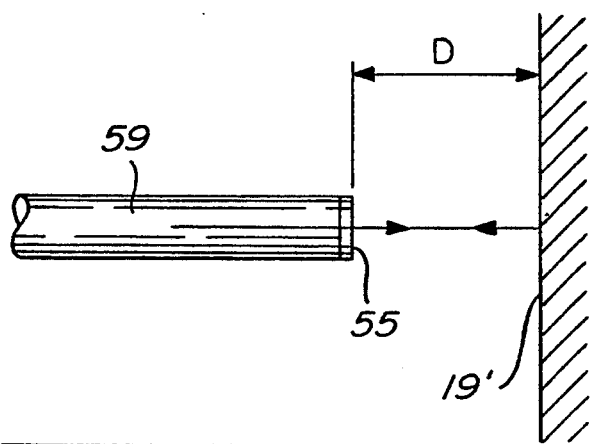
FIG. 13 is a schematic illustration of a modification of the sensor wherein it is replaced by a single mode fiber end and a reflective surface and utilized in a self-referencing system for measuring the gap between the fiber end and the reflective surface.

With reference to FIG. 13, there is shown, another embodiment of the sensor and wherein the sensor is simply provided by the single mode fiber 59 disposed a predetermined distance D in front of a reflective surface 19′. This surface 19′ is a flat mirror surface disposed parallel to the bandpass filter coating 55. This sensor is utilized as a self-referencing device for measuring the gap between the fiber end and the reflective surface.

It is within the ambit of the present invention to cover any obvious modifications of the preferred embodiment described herein, provided such modifications fall within the scope of the appended claims.

I claim:

1. A temperature compensated fiber optic sensor for measuring strain in a host structure, comprising:
   an elongated optical fiber having a first flat end comprising a reflecting surface;
   an elongated wire having a first flat end comprising a reflecting surface;
   a connecting sleeve for connecting said optical fiber with said elongated wire such that said first end of said optical fiber is in spaced, facing and parallel relationship with said first end of said elongated wire to define a gap D between said ends, said connecting sleeve being bonded to said host structure;
   said optical fiber being bonded to said connecting sleeve at an optical fiber bonding point spaced from said first end of said optical fiber;
   said elongated wire being bonded to said connecting sleeve at an elongated wire bonding point spaced from said first end of said elongated wire;
   said optical fiber bonding point being spaced from said elongated wire bonding point by a distance L comprising the sensor length;
   said elongated wire bonding point being spaced from said first end of said elongated wire by a distance $L_w$ comprising the wire length of said sensor;
   the material of said wire being selected such that:

$$C_{host}L = C_{wire}L_w$$

wherein:
   $C_{host}$ = thermal expansion coefficient of said host structure; and
   $C_{wire}$ = thermal expansion coefficient of said elongated wire.

2. A temperature compensated fiber optic sensor for measuring strain in a host structure, comprising:
   an elongated optical fiber having a first flat end comprising a reflecting surface;
   an elongated wire having a first flat end comprising a reflecting surface;
   a connecting sleeve for connecting said optical fiber with said elongated wire such that said first end of said optical fiber is in spaced, facing and parallel relationship with said first end of said elongated wire to define a gap D between said ends, said connecting sleeve being bonded to said host structure;
   a capillary tube encasing that part of the sensor comprising the elongated wire;
   said capillary tube being sealed at one end and being bonded, at its other end, at a capillary wire bonding point to said connecting sleeve;
   said optical fiber being bonded to said connecting sleeve at an optical fiber bonding point spaced from said first end of said optical fiber;
   said capillary tube bonding point being spaced from said optical fiber bonding point by a distance L comprising the sensor length;
   said elongated wire being bonded to said connecting sleeve at an elongated wire bonding point spatted from said first end of said elongated wire;
   said elongated wire bonding point being spaced from said first end of said elongated wire by a distance $L_w$ comprising the wire length of said sensor;
   the material of said wire being selected such that:

$$C_{host}L = C_{wire}L_w$$

wherein:
   $C_{host}$ = thermal expansion coefficient of said host structure; and
   $C_{wire}$ = thermal expansion coefficient of said elongated wire.

3. A temperature compensated fiber optic sensor for measuring strain in a host structure, comprising:
   an elongated optical fiber having a first flat end comprising a reflecting surface;
   an elongated wire having a first flat end comprising a reflecting surface;
   a connecting sleeve for connecting said optical fiber with said elongated wire such that said first end of said optical fiber is in spaced, facing and parallel relationship with said first end of said elongated wire to define a gap D between said ends, said connecting sleeve being bonded to said host structure;
   wherein, the reflecting surface of said elongated wire comprises a temperature sensitive reflector.

4. A temperature compensated fiber optic sensor for measuring strain in a host structure, comprising:
   an elongated single mode optical fiber having a first flat end comprising a bandpass filter;
   an elongated wire having a first flat end comprising a reflecting surface; and
   a connecting sleeve for connecting said optical fiber with said elongated wire such that said first end of said optical fiber is in spaced, facing and parallel relationship with said first end of said elongated wire to define a gap between said ends, said connecting sleeve being bonded to said host structure.

5. A sensor as defined in claim 4 wherein said bandpass filter comprises a multi-layer coating.

6. A fiber optic sensor system comprising a sensor as defined in claim 5 and further including;
   a broadband light source connected to said optical fiber through a single mode optical coupler to direct light to said sensor;
   a second coupler connected to an output of said first coupler at an input thereof, said second coupler having two outputs;
   said second coupler having light splitting means for splitting return light form said sensor and for directing said split light at said two outputs;
   a first opto-detector and a second opto-detector;
   a first output of said second coupler being connected to said first opto-detector, and a second output of said second coupler being connected to said second opto-detector through a bandpass filter;
   said bandpass filter being similar to the bandpass filter of said sensor; and
   detector means to detect spectral changes in said sensor by analyzing and processing information signals received from said first and second opto-detectors.

7. A system as defined in claim 6 wherein each said bandpass filters comprise a multi-layer coating;
   said bandpass filter having a bandwidth narrower than the bandwidth of said broadband light source;

said broadband light source and said bandpass filter having substantially the same center wavelengths.

8. A system as defined in claim 7 wherein said broadband light source is a light emitting diode.

9. A fiber optic sensor system as defined in claim 8 wherein said return light from said sensor comprises two light signals, a first light signal comprising light reflected by said bandpass filter of said sensor due to its narrower bandwidth than said light source, and a second light signal which is reflected light from said reflector surface, said two light signals providing a means to compensate for transmission line losses.

10. A fiber optic sensor system as claimed in claim 9 wherein said detector means is a computer having processing means to effect a spectral ratiometric analysis of information signals received from said opto-detectors resulting from said first and second light signals, said second light signal representing a strain or temperature measure and representative of said gauge length.

11. A fiber optic sensor system as claimed in claim 10 wherein light received by said first detector can be expressed as:

$$P_1 = \int (aI_r(w) + bRTI_r(w))dw$$

and light received by said second detector can be expressed as:

$$P_2 = \int F(w)(cI_r(w) + dRTI_r(w))dw$$

where R is the reflection coefficient of the reflector, a, b, c and d are constants.

12. A fiber optic sensor system as claimed in claim 11 wherein light received by said first detector can be expressed as:

$$P'_1 \int (1 - F_d(w))(a'I_r(w) + b'RTI_r(w))dw$$

and the light that reaches detector 25 can be expressed by $$P'_2 = \int F_d(w)(c'I_r(w) + d'RTI_r(w))dw$$

where a', b', c' and d' are constants.

13. A method of sensing strain or temperature comprising the steps of:
i) providing a temperature compensated fiber optic sensor, comprising an elongated optical fiber having a first flat end comprising a bandpass filter, an elongated wire having a first flat end comprising a reflecting surface, and a connecting sleeve for connecting said optical fiber with said elongated wire such that said first end of said optical fiber is in spaced, facing and parallel relationship with said first end of said elongated wire to define a gap between said ends, said connecting sleeve being bonded to said host structure;
ii) connecting a broadband light source to said optical fiber to direct light to said sensor;
iii) splitting return light from said single mode fiber to feed two opto-detectors; and
iv) detecting spectral changes in said sensor by analyzing and processing information signals received from said opto-detectors.

14. A method as claimed in claim 13 wherein said step (iv) comprises effecting a spectral ratiometric analysis of information signals received from said detectors to effect a strain measurement.

15. A method as claimed in claim 13 wherein said step (iv) comprises effecting a spectral ratiometric analysis of information signals received from said detectors to effect a temperature measurement.

16. A method as claimed in claim 13 wherein sale step (iv) comprises effecting a spectral ratiometric analysis of information signals received from said detectors to effect a temperature compensated strain measurement.

* * * * *